US012650676B1

(12) United States Patent
Sljivar

(10) Patent No.: US 12,650,676 B1
(45) Date of Patent: Jun. 9, 2026

(54) SYSTEMS AND METHODS FOR CUSTOM-DESIGNING GASKETS FOR A VIRTUAL REALITY INTERFACE

(71) Applicant: CustomFitVR LLC, San Diego, CA (US)

(72) Inventor: Slaven Sljivar, San Diego, CA (US)

(73) Assignee: CustomFitVR LLC, San Diego, CA (US)

( * ) Notice: Subject to any disclaimer, the term of this patent is extended or adjusted under 35 U.S.C. 154(b) by 728 days.

(21) Appl. No.: 18/146,015

(22) Filed: Dec. 23, 2022

(51) Int. Cl.
| | |
|---|---|
| G05B 19/4099 | (2006.01) |
| B29C 64/386 | (2017.01) |
| B33Y 50/00 | (2015.01) |
| B33Y 80/00 | (2015.01) |
| G06T 7/64 | (2017.01) |
| B29L 31/26 | (2006.01) |

(52) U.S. Cl.
CPC ........ G05B 19/4099 (2013.01); B29C 64/386 (2017.08); B33Y 50/00 (2014.12); B33Y 80/00 (2014.12); G06T 7/64 (2017.01); *B29L 2031/265* (2013.01); *G06T 2200/24* (2013.01); *G06T 2207/10016* (2013.01); *G06T 2207/10028* (2013.01); *G06T 2207/30201* (2013.01)

(58) Field of Classification Search
CPC ... G05B 19/4099; B29C 64/386; B33Y 50/00; B33Y 80/00; G06T 7/64; G06T 2200/24; G06T 2207/10016; G06T 2207/10028; G06T 2207/30201; B29L 2031/265
USPC ........................................................ 700/98
See application file for complete search history.

(56) References Cited

U.S. PATENT DOCUMENTS

| | | |
|---|---|---|
| D738,374 S | 9/2015 | Luckey |
| 9,817,476 B2 | 11/2017 | Jacobs |
| 9,989,998 B1 | 6/2018 | Yee |
| 10,045,449 B1 | 8/2018 | Yee |
| 10,425,636 B2 | 9/2019 | Bohn |
| 10,463,823 B2 | 11/2019 | Bachelder |
| 10,491,890 B1 | 11/2019 | Yildiz |
| 11,009,715 B2 | 5/2021 | Lochner |
| 2014/0261430 A1 | 9/2014 | Davis |
| 2015/0055085 A1 | 2/2015 | Fonte |
| 2015/0273170 A1 | 10/2015 | Bachelder |
| 2015/0362992 A1 | 12/2015 | Jacobs |

(Continued)

FOREIGN PATENT DOCUMENTS

| | | | | | |
|---|---|---|---|---|---|
| CN | 110060336 A | * | 7/2019 | ............. | G06T 17/00 |
| WO | WO-2015027196 A1 | * | 2/2015 | ........... | H04N 23/611 |

*Primary Examiner* — Kamini S Shah
*Assistant Examiner* — Michael Tang
(74) *Attorney, Agent, or Firm* — Esplin & Associates, PC

(57) ABSTRACT

Systems and methods to custom-design gaskets for a virtual reality (VR) interface, wherein the VR interface includes a head mounted display (HMD) to be worn by users are disclosed. Exemplary implementations may obtain facial geometry information for a user's face; generate a representation of the surface of the user's face, based on the facial geometry information; align the representation with a representation of the HMD; generate a model of a three-dimensional gasket that fits between the representation of the surface of the user's face and the representation of the HMD; export and/or present the model of the three-dimensional gasket; and/or perform other steps. Such custom-designed gaskets may provide an improved fit with better optical alignment when compared to mass-produced gaskets.

20 Claims, 4 Drawing Sheets

(56) References Cited

U.S. PATENT DOCUMENTS

| | | | |
|---|---|---|---|
| 2017/0082859 A1* | 3/2017 | Drinkwater | ........ G02B 27/0176 |
| 2018/0271234 A1 | 9/2018 | Monachon | |
| 2019/0235254 A1 | 8/2019 | Kamakura | |
| 2020/0081259 A1 | 3/2020 | Jo | |
| 2020/0081260 A1 | 3/2020 | Lochner | |
| 2020/0096775 A1 | 3/2020 | Franklin | |
| 2020/0159022 A1 | 5/2020 | Park | |
| 2020/0188175 A1 | 6/2020 | Haaber | |
| 2020/0341283 A1* | 10/2020 | McCracken | ....... G02B 27/0172 |
| 2021/0041707 A1 | 2/2021 | Misawa | |
| 2021/0353973 A1* | 11/2021 | Bhat | ...................... A62B 18/08 |
| 2022/0187609 A1 | 6/2022 | Snyder | |
| 2024/0273593 A1* | 8/2024 | Davidson | ........... G06Q 30/0621 |

* cited by examiner

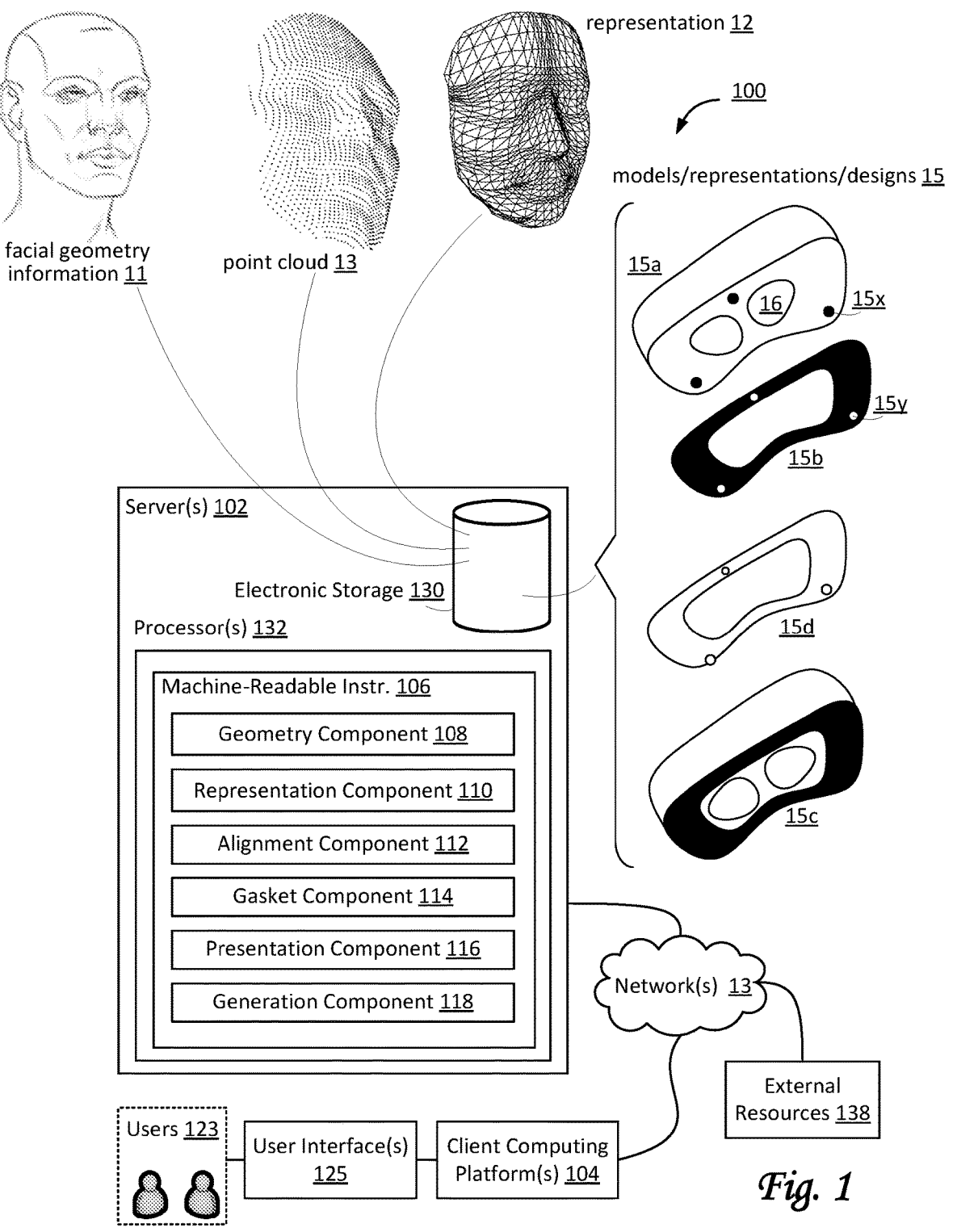

representation 12

100 facial geometry information 11 point cloud 13 models/representations/designs 15

15a 16    15x

15y

15b

15d

15c

Server(s) 102

Electronic Storage 130

Processor(s) 132

Machine-Readable Instr. 106

Geometry Component 108

Representation Component 110

Alignment Component 112

Gasket Component 114

Presentation Component 116

Generation Component 118

Network(s) 13

External Resources 138

Users 123

User Interface(s) 125

Client Computing Platform(s) 104

Fig. 1

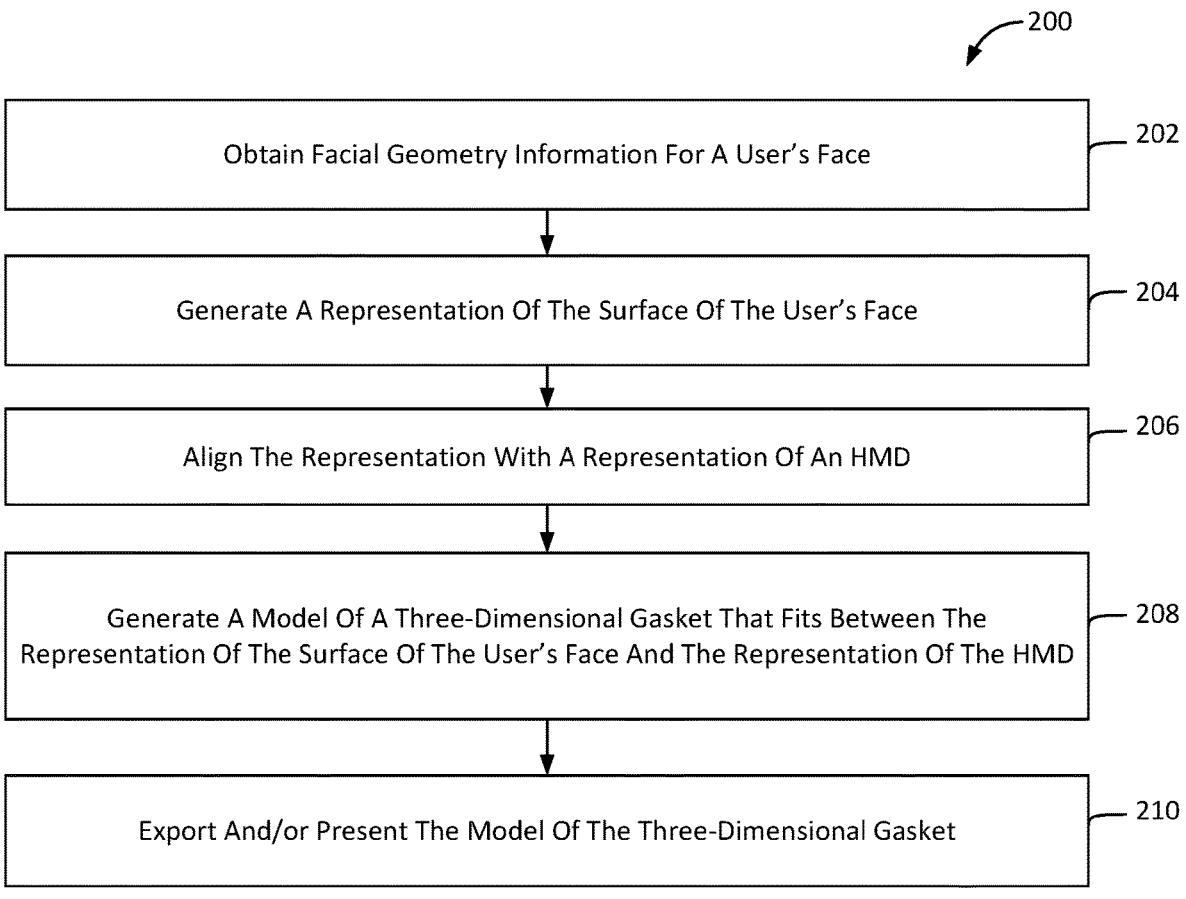

200

Obtain Facial Geometry Information For A User's Face — 202

Generate A Representation Of The Surface Of The User's Face — 204

Align The Representation With A Representation Of An HMD — 206

Generate A Model Of A Three-Dimensional Gasket That Fits Between The Representation Of The Surface Of The User's Face And The Representation Of The HMD — 208

Export And/or Present The Model Of The Three-Dimensional Gasket — 210

SYSTEMS AND METHODS FOR CUSTOM-DESIGNING GASKETS FOR A VIRTUAL REALITY INTERFACE

FIELD OF THE DISCLOSURE

The present disclosure relates to custom-designing gaskets for a head mounted display (HMD) to be worn by a user as a user interface to an interactive application, such as virtual or mixed reality, and automation of the same.

BACKGROUND

Virtual reality (VR) interfaces are known, including those with a head mounted display (HMD).

SUMMARY

One aspect of the present disclosure relates to a system configured for custom-designing gaskets for a virtual reality (VR) interface, wherein the VR interface includes a head mounted display (HMD) to be worn by users. The gaskets are designed to fit between the user's face and the HMD. The system may include electronic memory, one or more physical processors, and/or other components. The system may be configured to obtain facial geometry information for a user's face. The system may be configured to generate a representation of the surface of the user's face, based on the facial geometry information. The system may be configured to align the representation with a representation of the HMD. The system may be configured to generate a model of a three-dimensional gasket that fits between the representation of the surface of the user's face and the representation of the HMD. The three-dimensional gasket includes a rigid frame, padding, and/or other components. The system may be configured to export and/or present the model of the three-dimensional gasket. The system may be configured to perform other steps. A custom-designed gasket may provide an improved fit with better optical alignment when compared to mass-produced gaskets.

Another aspect of the present disclosure related to a method of custom-designing gaskets for a virtual reality (VR) interface, wherein the VR interface includes a head mounted display (HMD) to be worn by users. The gaskets are designed to fit between the user's face and the HMD. The method may include obtaining facial geometry information for a user's face. The method may include generating a representation of the surface of the user's face, based on the facial geometry information. The method may include aligning the representation with a representation of the HMD. The method may include generating a model of a three-dimensional gasket that fits between the representation of the surface of the user's face and the representation of the HMD. The three-dimensional gasket includes a rigid frame, padding, and/or other components. The method may include exporting and/or presenting the model of the three-dimensional gasket. The method may include performing other steps.

As used herein, any association (or relation, or reflection, or indication, or correspondency, or correlation) involving users, faces, representations, surfaces, gaskets, frames, padding, servers, processors, client computing platforms, users, output signals, determinations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates a system configured for custom-designing gaskets for a VR interface, in accordance with one or more implementations.

FIG. 2 illustrates a method of custom-designing gaskets for a VR interface, in accordance with one or more implementations.

DETAILED DESCRIPTION

Figure 3A:
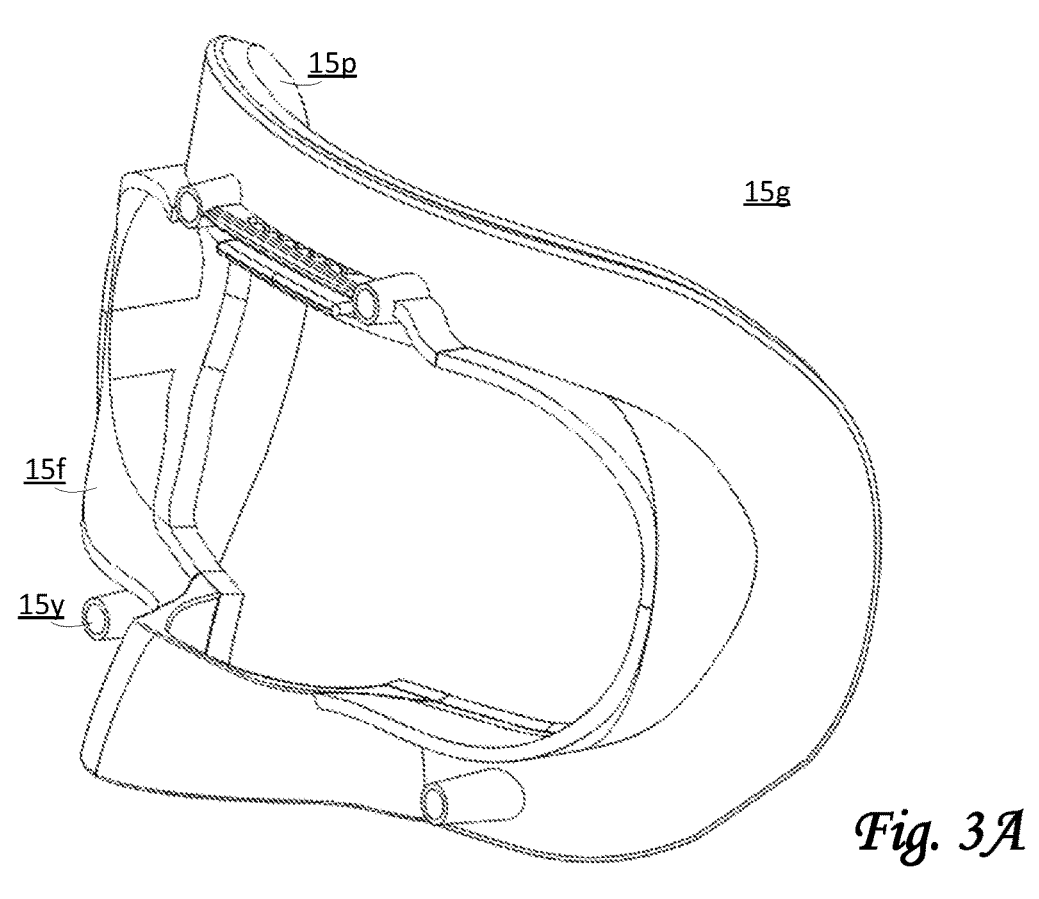
FIGS. 3A-3B illustrate an exemplary custom-designed gasket as may be designed by using a system configured for custom-designing gaskets for a VR interface, in accordance with one or more implementations.

FIG. 1 illustrates a system 100 configured for custom-designing (and custom producing) gaskets for VR interfaces, in accordance with one or more implementations. As used herein, a custom-designed gasket includes a rigid frame, padding, and/or other components. In particular, existing VR interfaces may include a head mounted display (HMD). Examples of these existing VR interfaces are included in, but are not limited to, PLAYSTATION VR™, OCULUS QUEST 2™, VALVE INDEX™, and/or other VR systems. An HMD includes electronic components, optical components such as lenses, and/or other components. Typically, a mass-produced HMD includes mass-produced (and/or standard or "one-size-fits-all") padding material that makes contact with the users' faces. Commonly, the padding material is removable and/or otherwise separable from at least the electronic components of an HMD. For example, users may wish to be able to clean the padding material. For example, standard padding material for some VR interfaces is part of a removable facial interface (this removable facial interface or gasket includes no electronic or optical components) that may be removed from the rest of an HMD. As used herein, custom-designed gaskets are intended to replace at least the mass-produced padding material (if not to replace both the removable facial interface (a.k.a. gasket) and its padding material, which may be integrated with the removable facial interface in some commercial designs) and fit between a user's face and the rest of the HMD (i.e., the HMD minus the removable facial interface and its padding material). Each custom-designed gasket is custom-designed for an individual user's face. As used herein, an HMD minus the removable facial interface and its padding material may simply be referred to as an HMD. A three-dimensional custom-designed gasket includes a rigid frame, padding, and/or other components.

System 100 may include one or more of server(s) 102, processor(s) 132, electronic storage 130, client computing platform(s) 104, user interface(s) 125, and/or other components. Users 123 (also referred to as users) may include one or more of a first user, a second user, and/or other users. As used in descriptions herein, any use of the term "user" may refer to user(s) 123, unless indicated otherwise.

In some implementations, server(s) 102 may be configured to communicate with one or more client computing platforms 104 according to a client/server architecture and/or other architectures. In some implementations, client computing platform(s) 104 may be configured to communicate with other client computing platforms via server(s) 102, wherein the communication uses a peer-to-peer architecture and/or other architectures. Users may access system 100 via client computing platform(s) 104. In some implementations, system 100 and/or components thereof may be configured to communicate with one or more of users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a geometry component 108, a representation component 110, an alignment component 112, a gasket component 114, a presentation component 116, a generation component 118, and/or other instruction components.

Geometry component 108 may be configured to determine and/or obtain information regarding users' faces. For example, geometry component 108 may obtain facial geometry information 11 for a particular user's face (as depicted in FIG. 1, facial geometry information 11 may be stored electronically, e.g., in electronic storage 130). As used herein, the term "facial geometry information" represents a surface of a user's face. For example, the surface of a user's face may include forehead, eyes, cheeks, nose, and/or other parts. In some implementations, facial geometry information may be determined based on one or more photographs and/or depth maps of a user's face. In some cases, multiple photographs and/or multiple depth maps may have been scanned and/or captured from multiple angles relative to the user's face (e.g., using a camera and/or sensor included in a client computing device that is associated with the user; the angles could include about 45 degrees to the left, about 45 degrees to the right, straight ahead, from below the chin, and/or other angles). In some implementations, certain conditions must be met for capturing photographs and/or depth maps, such as a certain distance between the camera (or sensor) and the user's face, a particular range of angles, the absence of glasses, the absence of hair covering forehead, the user's eyes being open, the user's face having a neutral expression (e.g., not smiling, not frowning, etc.), and/or other conditions. In some cases, individual photographs may include depth information.

In some implementations, facial geometry information may be determined based on video information depicting a user's face. For example, the video information may have been captured depicting the user's face (e.g., using a camera included in a client computing device that is associated with the user). In some implementations, the facial geometry information may converted into a signed distance function (SDF) (e.g., the facial geometry information may be represented by an SDF). For example, points with distance zero lie on the surface of the face, positive distance is outside the face, and negative distance is inside the face or head. In some implementations, facial geometry information may be obtained from a third party external to system 100 (e.g., through a third party application executing on the user's personal computing device or platform).

In some implementations, individual ones of the multiple photographs and/or multiple depth maps of the user's face may be converted by geometry component 108 into a point cloud, for example a point cloud 13 (as depicted in FIG. 1, point cloud 13 may be stored electronically, e.g., in electronic storage 130). In some cases, geometry component 108 may be configured to transform the individual photographs and/or multiple depth maps from a camera coordinate system (or a sensor coordinate system) to a coordinate system specific to the user's face. In some cases, geometry component 108 may be configured to align and/or otherwise combine multiple point clouds into a single point cloud (e.g., using pair-wise registration between two point clouds, until the single point cloud remains and/or is produced). In some implementations, particular information (or a particular representation) represented by a signed distance function (SDF) may be reconstructed from such a single point cloud. Many algorithms are known to accomplish reconstruction of surfaces (also referred to as "surface reconstruction") from point clouds.

Representation component 110 may be configured to generate representations of users' faces, e.g., based on user-specific facial geometry information (e.g., as captured). In some cases, these representations may be referred to as "geometric representations". In some cases, a mesh representation may be generated. Representation component 110 may generate a representation 12 of the surface of a particular user's face (as depicted in FIG. 1, representation 12 may be stored electronically, e.g., in electronic storage 130). In some cases, a particular mesh used may be a triangle mesh or, more generally, a polygon mesh. In some implementations, generating a mesh representation may be accomplished by converting a signed distance function (e.g., as reconstructed and/or otherwise obtained by geometry component 108) using the Marching Cubes algorithm, Delaunay triangulation, 3D alpha shape, dual contouring, or any other suitable approach or algorithm.

Alignment component 112 may be configured to align representations of users' faces with representations of HMDs. Models, representations, and designs may be stored electronically, e.g., in electronic storage 130, as depicted in FIG. 1 by models/representations/designs 15, which include a particular (three-dimensional) representation 15a of a particular HMD (minus the HMDs removable facial interface 15b which includes padding material). As depicted, the particular HMD may include one or more optical elements, such as, e.g., lens 16. For example, alignment component 112 may align a particular mesh representation of a particular user's face (e.g., as generated by representation component 110) with particular representation 15*a* of a particular HMD (minus removable facial interface 15*b*). In some implementations, alignment may include a rigid transformation applied to the particular mesh representation. Detailed geometric information of one or more specific models of HMD is assumed to be available and obtained by system 100 prior to the operations of alignment component 112. For example, models/representations/designs 15 may include a (three-dimensional) representation 15*c* of an HMD. In some implementations, representations of HMDs, such as particular representation 15*a*, may include one or more mating elements 15*x*. One or more mating elements 15*x* may be configured to mate with corresponding mating elements that are included in facial interface 15*b* (here, e.g., mating element 15*y* mates with mating element 15*x*). In some cases, these mating elements may snap together. In some cases, these mating elements may include magnetic elements. Other mechanisms to removably couple an HMD to its facial interface are considered within the scope of this disclosure.

Figure 3B:
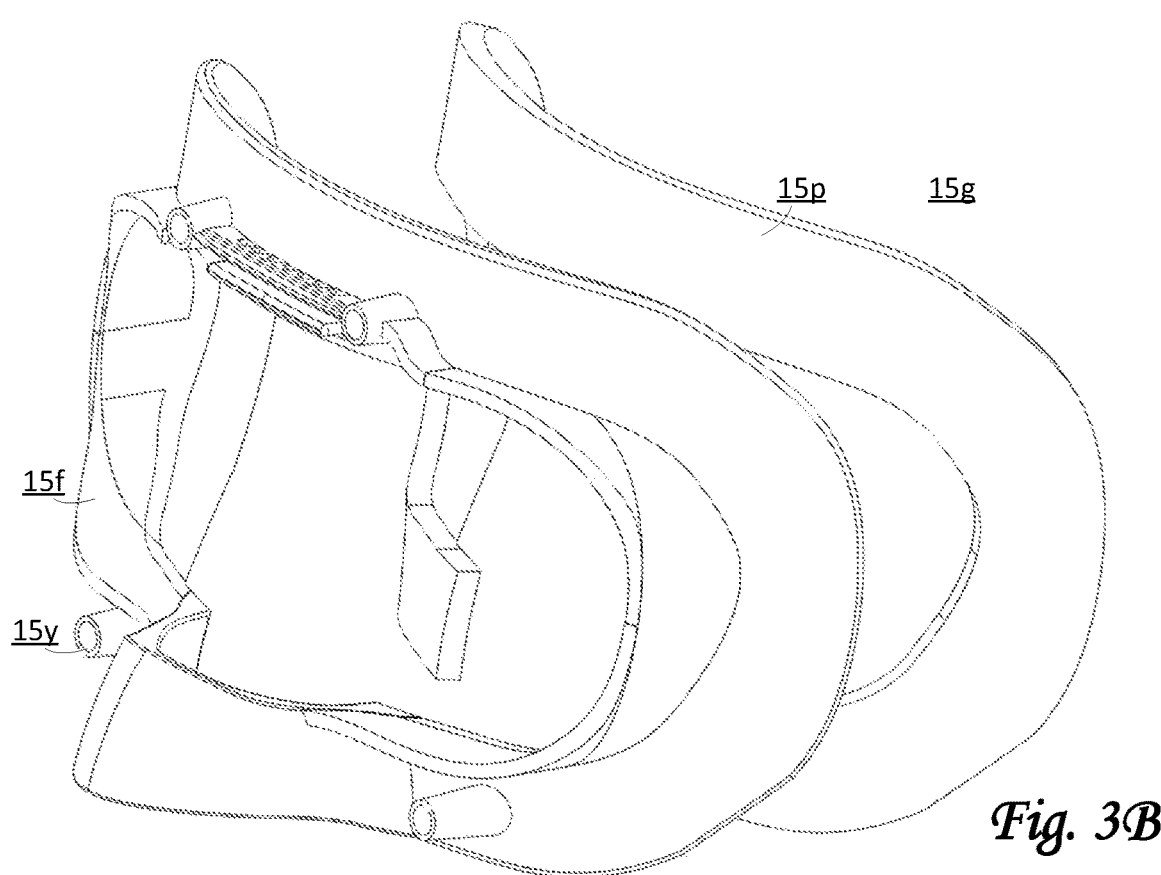

By way of non-limiting example, FIG. 3A illustrates an angled view from the front of an exemplary custom-designed gasket 15*g* as may have been designed using system 100. As depicted, exemplary custom-designed gasket 15*g* includes at least one mating element 15*y* as described elsewhere, a rigid frame 15*f*, a padding 15*p*, and/or other components. As shown, rigid frame 15*f* and padding 15*p* match and are coupled. By way of non-limiting example, FIG. 3B illustrates an exploded view of the same custom-designed gasket 15*g* from the same angle as used for FIG. 3A, illustrating separation between rigid frame 15*f* and padding 15*p*.

Figure 4A:
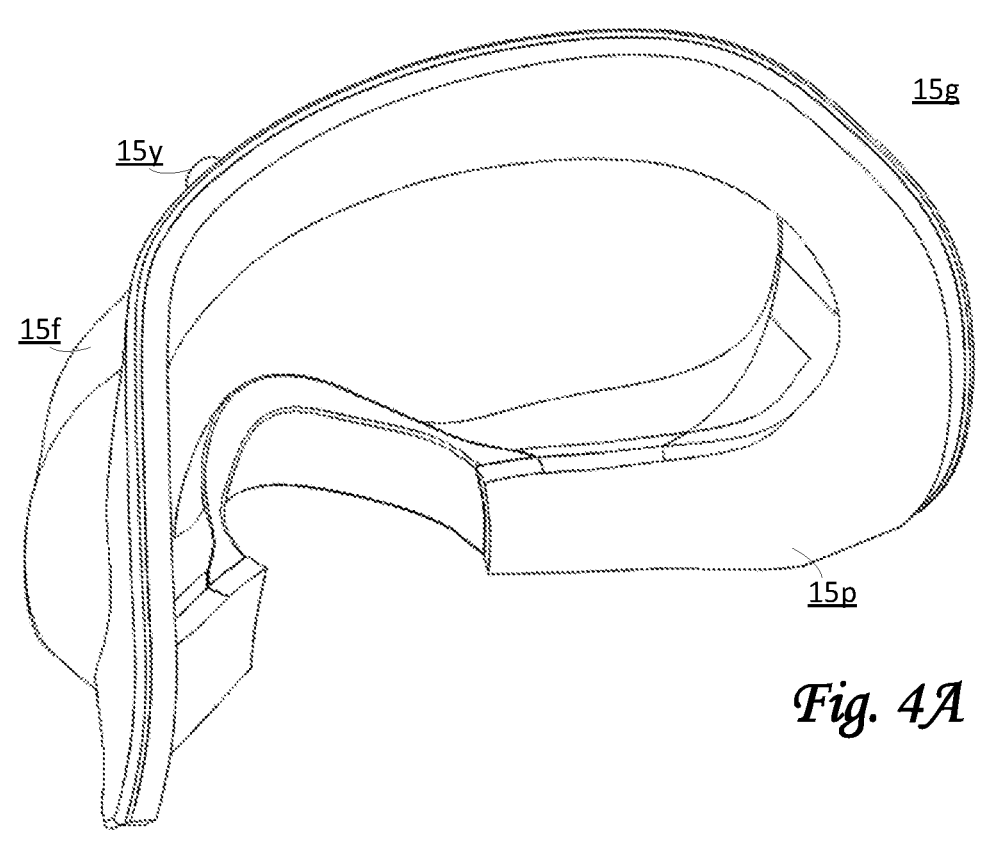
FIGS. 4A-4B illustrate an exemplary custom-designed gasket as may be designed by using a system configured for custom-designing gaskets for a VR interface, in accordance with one or more implementations.
Figure 4B:
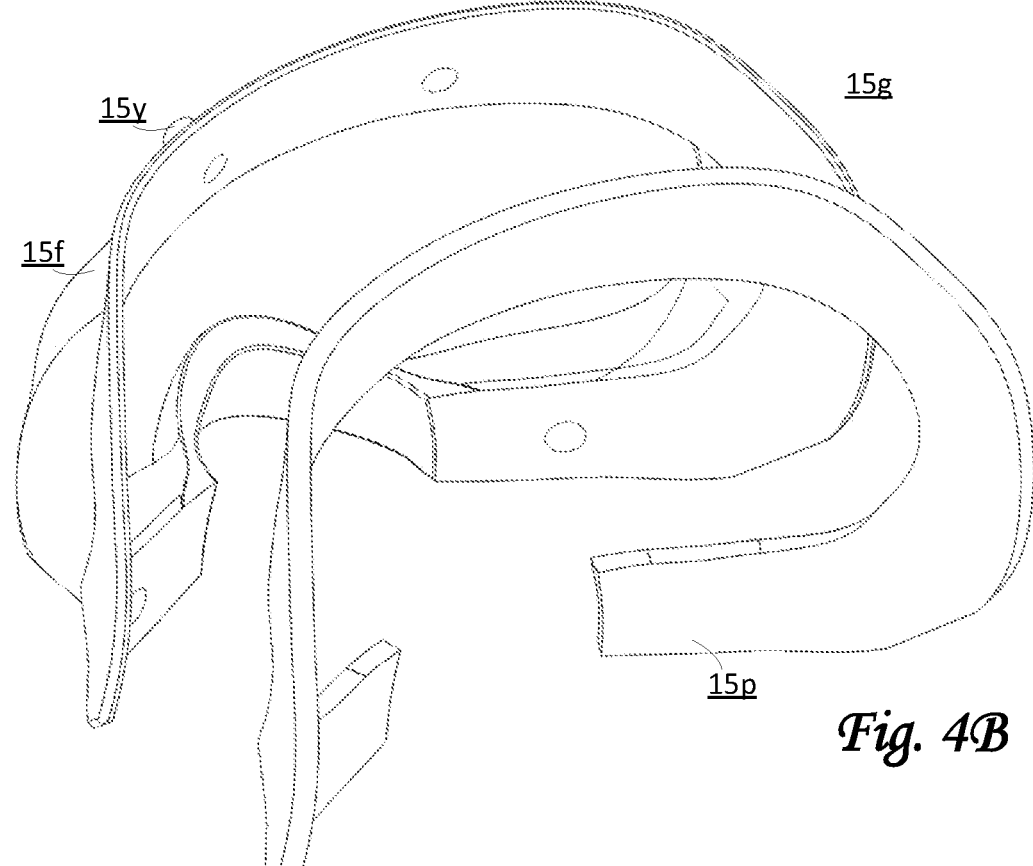

By way of non-limiting example, FIG. 4A illustrates an angled view from the back of exemplary custom-designed gasket 15*g* as may have been designed using system 100. As depicted, exemplary custom-designed gasket 15*g* includes at least one mating element 15*y* as described elsewhere, rigid frame 15*f*, padding 15*p*, and/or other components. As shown, rigid frame 15*f* and padding 15*p* match and are coupled. By way of non-limiting example, FIG. 4B illustrates an exploded view of the same custom-designed gasket 15*g* from the same angle as used for FIG. 4A, illustrating separation between rigid frame 15*f* and padding 15*p*.

Referring to FIG. 1, in some implementations, alignment may include positioning the particular user's eye pupils in a suitable area relative to the HMD (particularly, relative to its lenses and/or other optical components). Alternatively, and/or simultaneously, alignment may be performed to improve and/or maximize the particular user's optical clarity and/or field of view during usage. Alternatively, and/or simultaneously, alignment may be performed such that at least a minimum amount of space is preserved and/or otherwise maintained between different surfaces and/or areas of a custom-designed gasket and the corresponding parts of the surface of the particular user's face. In some implementations, this alignment includes a translation, so the particular user's eyes and eyelashes are not touching the lenses of the HMD. In some cases, a first transformation puts pupils against the lenses, and this translation creates just enough space to resolve interferences. In some implementations, alignment by alignment component 112 may include tilting the angle of the HMD, which in some cases means a smaller translation is sufficient to resolve the interferences. For example, tilting the bottom of the representation of the HMD towards the surface of the user's face may improve the user's field of view.

Gasket component 114 may be configured to generate models of three-dimensional gaskets. In particular, gasket component 114 generates a model 15*d* of a three-dimensional gasket that fits between a particular mesh representation of the surface of a particular user's face (e.g., as generated by representation component 110) and a particular representation of a particular HMD (minus the HMD's removable facial interface and its padding material). Model 15*d* of the three-dimensional gasket may be stored electronically, e.g., in electronic storage 130, as depicted in FIG. 1.

In some implementations, the three-dimensional gasket includes a rigid frame and padding. For example, the three-dimensional gasket may be similar to facial interface 15*b*, which includes a rigid frame on the side of the HMD and padding on the side of the user's face. The rigid frame of the three-dimensional gasket may be configured to engage with one or more user-facing surfaces of the representation of the particular HMD. The padding of the three-dimensional gasket may be configured to fit the particular mesh representation of the surface of the particular user's face. The rigid frame may be configured to couple with the padding. In some implementations, generation of the model of the three-dimensional gasket may include determination of a portion of the surface of the user's face on which the rigid frame of the three-dimensional gasket will apply pressure. For example, this step may determine at least one of the shape, size, width, and/or thickness of the padding. In some cases, the inner edge and outer edge of the rigid frame may be determined separately. In some implementations, generation of the model of the three-dimensional gasket may include determination of a first point between the right eye and the right ear of the particular user where the padding will touch the surface of the particular user's face. In some implementations, generation of the model of the three-dimensional gasket may include determination of a second point between the left eye and the left ear of the particular where the padding will touch the surface of the particular user's face.

In some implementations, generation of the model of the three-dimensional gasket may include placement of one or more mating elements on the outside, i.e. the HMD-facing surface of the rigid frame. The one or more mating elements mate with the one or more user-facing surfaces of the (representation of the) HMD. In some implementations, generation of the model of the three-dimensional gasket may include determination of a design of the padding. In other implementations, the three-dimensional design of the rigid frame may be determined by predefined padding design (in which case this predefined design is used as a constraint for the rigid frame). The padding may be configured to couple with the rigid frame. In some implementations, generation of the model of the three-dimensional gasket may include determining a three-dimensional curve where the surface of the user's face intersects with an eye opening geometry. In some cases, this three-dimensional curve will be the inner edge of the padding. In some cases, the outer edge may be a fixed width outside of this inner edge. In other cases, the outer edge may follow a specific width profile such that padding is wider in the areas where force is concentrated, such as the forehead, in order to distribute the pressure on the user's face. The eye opening geometry may be determined based on the geometric information of the specific model of HMD.

Presentation component 116 may be configured to export and/or present models of three-dimensional gaskets, e.g., as generated by gasket component 114. In some implementations, presentation component 116 may be configured to export a particular model of a three-dimensional custom-designed gasket. For example, presentation component 116 may export one or more electronic files representing certain information, including but not limited to a particular rigid frame. In some implementations, an electronic file may have a format suitable for an additive manufacturing process, including but not limited to 3D-printing. In some cases, exemplary additive manufacturing processes may use one or more of fused deposition modeling (FDM), selective laser sintering (SLS), multi-jet fusion (MJF), stereolithography (SLA), material jetting, and/or other processes or techniques. In some implementations, an electronic file may represent a mold for casting and curing of particular padding, for example using silicone. In some implementations, an electronic file may include and/or provide instructions for a Computer Numerical Control (CNC) machine to cut padding, or components of a padding that can be assembled into a padding. In some implementations, the padding, of components of particular padding may be cut from a flat sheet of material.

In some implementations, presentation component 116 may be configured to present a user interface to the user, depicting one or more representations of (i) the model of the three-dimensional gasket, (ii) the rigid frame, and/or (iii) the padding. The one or more representations may include one or more mesh representations.

Generation component 118 may be configured to control generation of the rigid frame of the three-dimensional gasket. For example, generation component 118 may control generation of a particular rigid frame through an additive manufacturing process (not depicted in FIG. 1).

Referring to FIG. 1, user interfaces 125 may be configured to facilitate interaction between users 123 and system 100, and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Referring to FIG. 1, in some implementations, components of system 100, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes operative linking via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services (e.g., a server external to system 100), external providers of relevant information, and/or other resources. In some implementations, some or all of the functionality attributed herein to external resources 138 may be provided by resources included in system 100. In some implementations, one or more external resources 138 may provide information to other components of system 100, including but not limited to detailed geometric information of one or more specific models of HMD.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together.

Electronic storage 130 may comprise non-transitory storage media that electronically stores information. The electronic storage media may include one or both of system storage that is provided integrally (i.e., substantially non-removable) with a corresponding server and/or removable storage that is removably connectable to the corresponding server via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by corresponding processor(s), information received from corresponding server(s), information received from client computing platform(s) 104, and/or other information that enables server(s) 102 to function as described herein. Electronic storage 130 may also be referred to as electronic memory 130.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, and/or 118, and/or other components. Processor(s) 132 may be configured to execute components 108, 110, 112, 114, 116, and/or 118, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, this is exemplary. In implementations in which processor(s) 132 and/or processor(s) 132 include multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes only, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 132 may be configured to execute one or more additional components that may perform some or all of the functionality attributed below to one of components 108, 110, 112, 114, 116, and/or 118.

FIG. 2 illustrates a method 200 of custom-designing gaskets for a VR interface, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Regarding method 200, at an operation 202, facial geometry information for a user's face is obtained. The facial geometry information represents a surface of the user's face. The surface includes forehead, eyes, cheeks, and nose. In some embodiments, operation 202 is performed by a geometry component the same as or similar to geometry component 108 (shown in FIG. 1 and described herein).

At an operation 204, a representation of the surface of the user's face is generated, based on the facial geometry information. In some embodiments, operation 204 is performed by a representation component the same as or similar to representation component 110 (shown in FIG. 1 and described herein).

At an operation 206, the representation is aligned with a representation of the HMD. In some embodiments, operation 206 is performed by an alignment component the same as or similar to alignment component 112 (shown in FIG. 1 and described herein).

At an operation 208, a model of a three-dimensional gasket is generated that fits between the representation of the surface of the user's face and the representation of the HMD. The three-dimensional gasket includes a rigid frame and padding. The rigid frame is configured to engage with one or more user-facing surfaces of the representation of the HMD. The padding is configured to fit the representation of the surface of the user's face. The rigid frame is configured to couple with the padding. Generating the model of the three-dimensional gasket includes (i) determining a portion of the surface of the user's face on which the rigid frame of the three-dimensional gasket will apply pressure, (ii) placing mating elements on outside of the rigid frame that mate with the one or more user-facing surfaces of the representation of the HMD, and (iii) determining a design of the padding. The padding is configured to couple with the rigid frame. In some embodiments, operation 208 is performed by a gasket component the same as or similar to gasket component 114 (shown in FIG. 1 and described herein).

At an operation 210, the model of the three-dimensional gasket is exported and/or presented. In some embodiments, operation 210 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured for custom-designing an manufacturing gaskets for a virtual reality (VR) interface, wherein the gaskets are customized for individual users, wherein the VR interface includes a head mounted display (HMD) to be worn by the individual users, the system comprising:

electronic memory configured to store information digitally; and one or more physical processors configured by machine-readable instructions to:

obtain facial geometry information for a user's face, wherein the facial geometry information represents a surface of the user's face, wherein the surface includes forehead, eyes, cheeks, and nose of a user;

generate a representation of the surface of the user's face, based on the facial geometry information, wherein the representation is in electronic format, and wherein the representation includes three-dimensional locations of the eyes of the user;

generate an alignment between the representation of the surface of the user's face and a representation of at least a portion of the HMD, wherein the alignment is generated such that at least a minimum amount of space is preserved between one or more optical elements of the HMD and the three-dimensional locations of the eyes of the user that are included in the representation of the surface of the user's face, and further such that a bottom portion of the HMD is tilted towards the surface of the user's face;

based on the alignment, generate a model of a three-dimensional gasket that fits between the representation of the surface of the user's face and the representation of at least the portion of the HMD, wherein the model is in electronic format, wherein the three-dimensional gasket includes a rigid frame and padding, wherein the rigid frame is configured to removably connect with one or more user-facing surfaces of the representation of at least the portion of the HMD, wherein the padding is configured to fit the representation of the surface of the user's face, and wherein the rigid frame is configured to removably connect with the padding and further configured to removably connect with one or more user-facing surfaces of the HMD, wherein the one or more user-facing surfaces of the HMD correspond with the one or more user-facing surfaces of the representation of at least the portion of the HMD, wherein generation of the model of the three-dimensional gasket includes:

(i) determination of a portion of the surface of the user's face on which the rigid frame of the three-dimensional gasket will apply pressure, based on the obtained facial geometry information;

(ii) placement of mating elements on an outside of the rigid frame that are configured to mate with the one or more user-facing surfaces of the HMD; and (iii) determination of a design of the padding, based on the obtained facial geometry information, wherein the padding is configured to removably connect with the rigid frame;

export and/or present the model of the three-dimensional gasket; and manufacture at least the rigid frame of the three-dimensional gasket, wherein manufacturing is based on the model of the three-dimensional gasket as generated.

2. The system of claim 1, wherein the facial geometry information is determined based on multiple photographs and/or multiple depth maps of the user's face, wherein the multiple photographs and/or the multiple depth maps have been captured from multiple angles relative to the user's face.

3. The system of claim 1, wherein the facial geometry information is based on video information that has been captured of the user's face, and wherein the representation of the surface of the user's face uses a signed distance function (SDF).

4. The system of claim 1, wherein the one or more physical processors are further configured to:

present a user interface to the user, depicting one or more representations of (i) the model of the three-dimensional gasket, (ii) the rigid frame, and/or (iii) the padding, wherein the one or more representations include one or more mesh representations.

5. The system of claim 1,
wherein the model of the three-dimensional gasket is exported as an electronic file, wherein the electronic file has a format suitable for an additive manufacturing process.

6. The system of claim 1,
wherein the model of the three-dimensional gasket is exported as an electronic file representing a mold for casting and curing the padding.

7. The system of claim 1,
wherein the manufacturing of the rigid frame of the three-dimensional gasket uses an additive manufacturing process.

8. The system of claim 1, wherein generating the three-dimensional gasket further includes determining a three-dimensional curve where the surface of the user's face intersects with an eye opening geometry.

9. The system of claim 1, wherein the alignment of the representation includes tilting the bottom portion of the HMD towards the cheeks of the user's face.

10. The system of claim 1, wherein generating the model further includes:

(iv) determination of a first point between the right eye and the right ear where the padding will touch the surface of the user's face, and a second point between the left eye and the left ear where the padding will touch the surface of the user's face.

11. A method of custom-designing and manufacturing gaskets for a virtual reality (VR) interface, wherein the gaskets are customized for individual users, wherein the VR interface includes a head mounted display (HMD) to be worn by the individual users, the method comprising:

obtaining facial geometry information for a user's face, wherein the facial geometry information represents a surface of the user's face, wherein the surface includes forehead, eyes, cheeks, and nose of a user;

generating a representation of the surface of the user's face, based on the facial geometry information, wherein the representation is in electronic format, and wherein the representation includes three-dimensional locations of the eyes of the user;

generating an alignment between the representation of the surface of the user's face and a representation of at least a portion of the HMD, wherein the alignment is generated such that at least a minimum amount of space is preserved between one or more optical elements of the HMD and the three-dimensional locations of the eyes of the user that are included in the representation of the surface of the user's face, and further such that a bottom portion of the HMD is tilted towards the surface of the user's face;

based on the alignment, generating a model of a three-dimensional gasket that fits between the representation of the surface of the user's face and the representation of at least the portion of the HMD, wherein the model is in electronic format, wherein the three-dimensional gasket includes a rigid frame and padding, wherein the rigid frame is configured to removably connect with one or more user-facing surfaces of the representation of at least the portion of the HMD, wherein the padding is configured to fit the representation of the surface of the user's face, and wherein the rigid frame is configured to removably connect with the padding and further configured to removably connect with one or more user-facing surfaces of the HMD, wherein the one or more user-facing surfaces of the HMD correspond with the one or more user-facing surfaces of the representation of at least the portion of the HMD, wherein generating the model of the three-dimensional gasket includes (i) determining a portion of the surface of the user's face on which the rigid frame of the three-dimensional gasket will apply pressure, based on the obtained facial geometry information, (ii) placing mating elements on an outside of the rigid frame that are configured to mate with the one or more user-facing surfaces of the HMD, and (iii) determining a design of the padding, based on the obtained facial geometry information, wherein the padding is configured to removably connect with the rigid frame;

exporting and/or presenting the model of the three-dimensional gasket; and manufacturing at least the rigid frame of the three-dimensional gasket, wherein manufacturing is based on the model of the three-dimensional gasket as generated.

12. The method of claim 11, wherein the facial geometry information is determined based on multiple photographs and/or multiple depth maps of the user's face, wherein the multiple photographs and/or multiple depth maps have been captured from multiple angles relative to the user's face.

13. The method of claim 11, wherein the facial geometry information is based on video information that has been captured of the user's face, and wherein the representation of the surface of the user's face uses a signed distance function (SDF).

14. The method of claim 11, further comprising:

presenting a user interface to the user, depicting one or more representations of (i) the model of the three-dimensional gasket, (ii) the rigid frame, and/or (iii) the padding, wherein the one or more representations include one or more mesh representations.

15. The method of claim 11, wherein the model of the three-dimensional gasket is exported as an electronic file, wherein the electronic file has a format suitable for an additive manufacturing process.

16. The method of claim 11, wherein the model of the three-dimensional gasket is exported as an electronic file representing a mold for casting and curing the padding.

17. The method of claim 11, wherein the manufacturing of the rigid frame of the three-dimensional gasket uses an additive manufacturing process.

18. The method of claim 11, wherein generating the three-dimensional gasket further includes determining a three-dimensional curve where the surface of the user's face intersects with an eye opening geometry.

19. The method of claim 11, wherein the alignment of the representation includes tilting the bottom portion of the HMD towards the cheeks of the user's face.

20. The method of claim 11, wherein generating the model further includes:

(iv) determining a first point between the right eye and the right ear where the padding will touch the surface of the user's face, and a second point between the left eye and the left ear where the padding will touch the surface of the user's face.

\* \* \* \* \*